Figure 1:
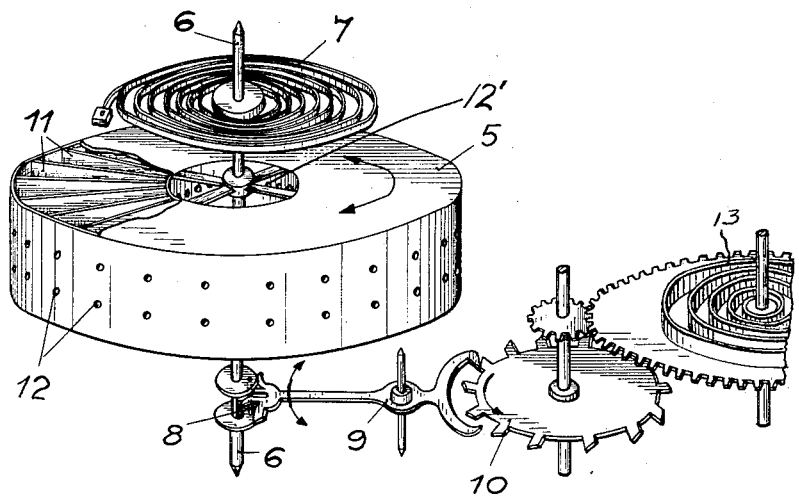

Nov. 28, 1933.　　　　　　H. A. ROMP　　　　　1,937,437
APPARATUS FOR DETERMINING THE SPECIFIC GRAVITY OF GASES AND VAPORS
Filed Aug. 27, 1928　　　2 Sheets-Sheet 1

Inventor:
Hendrik A. Romp
by Langner Parry
　　Card + Langner
　　　　　　Attys.

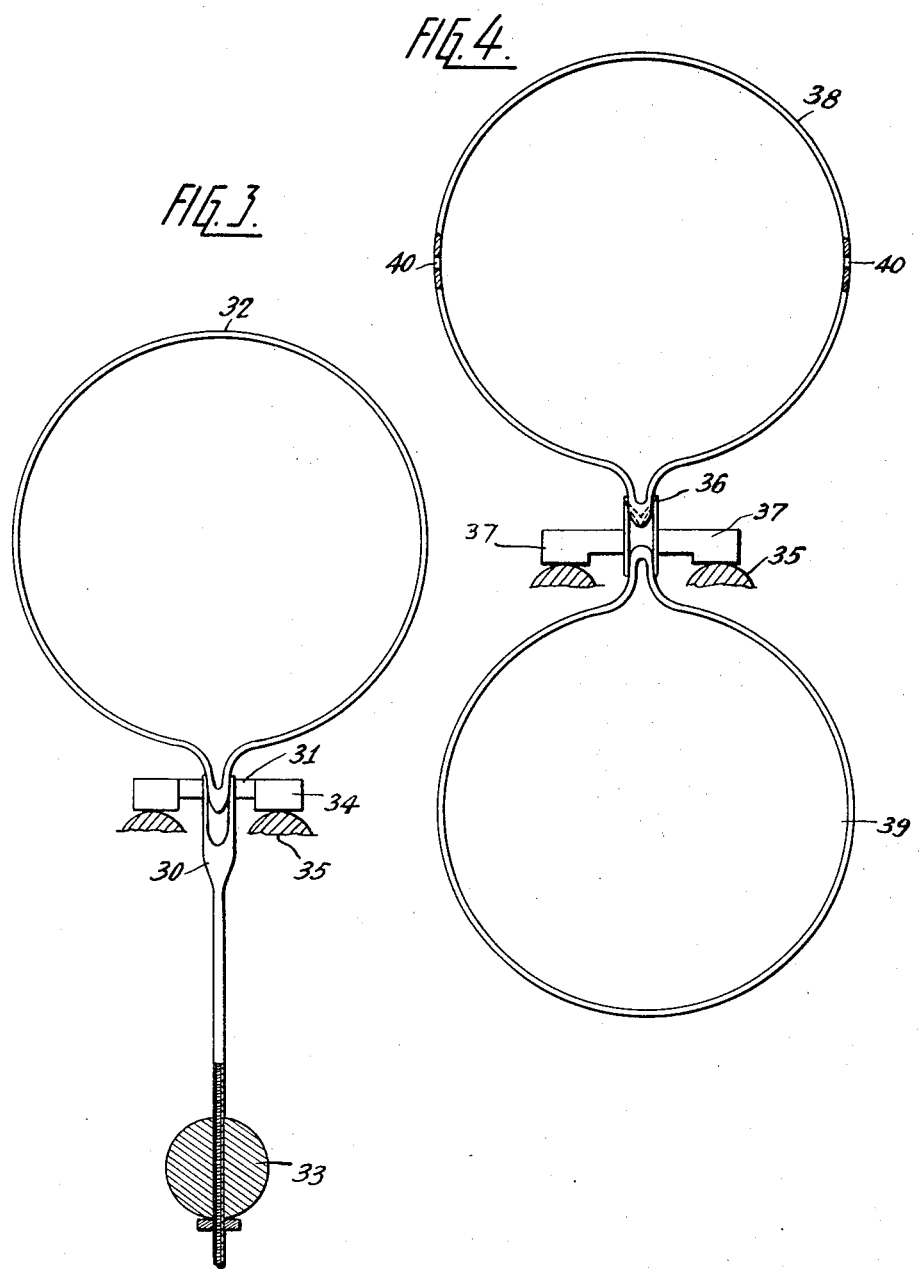

Patented Nov. 28, 1933

1,937,437

UNITED STATES PATENT OFFICE 1,937,437

APPARATUS FOR DETERMINING THE SPECIFIC GRAVITY OF GASES AND VAPORS

Hendrik Arnold Romp, Soeban Djerigi, Sumatra, Dutch East Indies

Application August 27, 1928, Serial No. 302,423, and in the Netherlands March 14, 1928

4 Claims. (Cl. 265—44)

This invention relates to apparatus for determining the specific gravity of gases and vapors, and which includes among its objects that of providing an oscillatory densimeter for ascertaining the specific gravity of the gas under investigation through the oscillations of the densimeter.

It is usual to determine the weight of a quantity of gas (this also including a vapor in the present specification and claims) which cannot be directly weighed, from the value of other magnitudes which can be directly measured, and particularly from the specific gravity.

In carrying out such calculations, particularly with gases under high pressure, the difficulty is that the specific gravity of the gases is not known under the conditions of weighing nor can it be measured in simple manner with present apparatus. This unknown specific gravity is thus deduced from a known specific gravity under different temperature and pressure conditions, and since this deduction can be made only by the use of equations of state (Boyle—Gay Lussac; v. d. Waals), it is obvious that it is possible only to obtain a value which in general deviates the more from the correct value the closer the gases are to their critical point (the more the character of the gases differs from those of an ideal gas).

According to the present invention these difficulties are overcome by measuring the specific gravity of the gas under the same or approximately the same conditions as the other auxiliary magnitudes which are necessary for calculating the specific gravity.

The principle of the apparatus according to the invention consists in that the gas, the specific gravity of which is to be determined, is placed in contact with a periodically moving mechanical apparatus, the periods of which are influenced by the specific gravity of the gas; the measuring of the specific gravity is furnished by measuring the periods of oscillation.

This principle is utilized advantageously in practical manner in two ways hereinafter described, as well as in the combination thereof. In one method of use the gas forms a constituent of the moving element of a mechanical oscillatory system, in the second the gas serves as a medium wherein a mechanical system oscillates. Accordingly, use is made either of the mass or the weight of a definite volume of gas in order to vary or influence the forces causing an oscillating movement of the mechanical system. In both cases the oscillation period of the system is, in general, a function of the specific gravity of the gas. Therefore, the specific gravity of the gas investigated may be determined by measuring the oscillation period and comparison with the oscillation period obtained with a gas of known specific gravity.

As compared with hitherto known and used apparatus that of the invention is of advantage in that, with suitable construction and selection of the material of the apparatus used, it is possible to measure the desired specific gravity in very simple manner. It is calculated from the oscillation period of the system with or in the gas to be investigated compared with the oscillation period of the system with or in a gas of known specific gravity. The movement of the system may be maintained by means of a spring with gear mechanism and escapement, by a pendulum, by means of an electrical apparatus, or by any other means usual in clockworks.

The oscillation periods may be previously measured in air at atmospheric pressure and predetermined temperature in order to calibrate the apparatus, and in other gases under conditions whereby the specific gravity is known, so that it is possible to determine the constants of the apparatus by means of which, in gases of unknown specific gravity also, it is possible to determine the specific gravity of said gases from the periods of oscillation. The apparatus can be controlled as desired by repeating the oscillation period measurements in air at atmospheric pressure.

Figure 2:
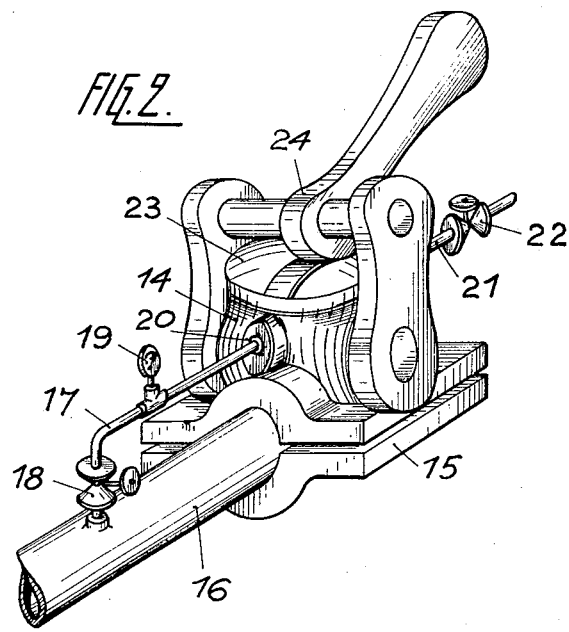

Figure 1 is a perspective view of an oscillatory drum wherein use is made exclusively of the mass of a definite volume of gas for influencing the oscillation period of the drum, Figure 2 is a perspective view of means by which the apparatus shown in Figure 1 can be intercalated into a high pressure gas line, Figure 3 is a view in elevation, partly in section, of a specialized pendulum in which use is made exclusively of the weight of a definite volume of the gas, Figure 4 is a view in elevation, partly in section, showing a form of pendulum wherein use is made of the two combined effects.

Referring now in detail to the several figures and first adverting to that form of the invention shown in Figure 1, an annular drum 5 is provided which is mounted on a shaft 6. A spring 7 places the drum in position to describe repeated oscillations in the same manner as does the balance of a clock. A pin 8 on the shaft 6 engages an escapement lever 9 which governs the escapement wheel 10, the latter being run by a clock spring 13 and which also may operate recording apparatus as in other well known clock or recording devices. Mounted in the drum is a plurality of radial intermediate walls 11 which form compartments communicating with the atmosphere through holes 12 and 12′ in the outer and inner walls. These holes are so small that while the gas in the compartment is renewed by the centrifugal force engendered by the oscillation of the drum the result of the measure is not appreciably influenced thereby. In case, therefore, the mechanism operates in an atmosphere of the same gas as that the specific gravity of which is to be ascertained, this gas is also found within the drum and its mass will exert an influence upon the period of oscillation.

For measuring the specific gravity of the gas flowing through a pipe, the densimeter, that is to say, the oscillating drum or the balance drum with its auxiliary mechanism may be mounted in a case 14 (Figure 2) which is attached to the pipe 16 by means of a saddle plate 15. Said casing is intercalated in a by-pass 17 the latter being provided with regulating valves 18 and 22 at its inlet and outlet ends, as shown, and being provided with desirable accessory devices such as pressure gauge 19 and filter 20. If desired, the pipe 16 can be provided intermediate the ends of the by-pass with an orifice for measuring purposes. The casing 14 may be furnished with a cover 23 having a lever construction 24 which renders the instrument which may be housed within the casing readily accessible for inspection, reading the record, etc.

The housing 14 being clamped around the pipe 16 easily assumes the temperature of the pipe and the gas flowing therein.

The apparatus shown in Figure 3 consists of a vertical pendulum 30 whose shaft above the suspension or pivot point 31 is provided with a sealed hollow sphere 32. The bob 33 of the pendulum is solid and made of a material having a high specific gravity. The pivot point 31 may be provided with knife edges 34 resting upon suitable bearings 35. The hollow sphere 32 may be evacuated or filled with a gas preferably of low specific gravity. The various weights and dimensions are selected such that when the pendulum is placed in an evacuated chamber it is in indifferent or neutral equilibrium, that is to say, it will maintain any angular position in which it may be placed.

If this pendulum is suspended in the gas to be investigated the hollow sphere will be acted upon upwardly through the resultant of all forces acting upwardly on the instrument, and if the pendulum is then oscillated, the oscillatory period will be in inverse ratio to the square root of the specific gravity of the gas. The pendulum will show a shorter oscillation period according as the density of the gas is larger, and vice versa. If it be desired to determine only relatively small variations in specific gravity it is preferable to design or adjust the pendulum so that the pendulum is in approximate indifferent equilibrium, in a gas of the least specific gravity coming into consideration; the ratio between the period of oscillation and the specific gravity is then somewhat less simple.

The pendulum can also be connected in known manner with an escapement in the same manner as is the drum shown in Figure 1; also, as described for Figure 1, the instrument may be enclosed in a suitable housing. It has not been thought necessary to repeat any of these details in Figure 3. The manner in which the pendulum of Figures 3 and 4 may be connected to the escapements is substantially the same as in Figure 1, the shaft of the drum being replaced by the shaft or extended pivot point of the pendulums. The rearrangement will require the turning over 90° of the clockwork mechanism. In order to eliminate the influence of temperature on the operation of the instrument the pendulum shaft may be made of invar alloy or use may be made of any other known compensating substance or method.

Figure 4 shows an apparatus in which the gas modifies the oscillation period of the system in two ways: first because a volume of gas constitutes part of the oscillating system, and its mass follows the oscillating movement; secondly because a force acts on the system, contrary to the force of gravity and depending on the weight of a volume of gas equal to the volume of the system itself. The oscillating member here is a vertical pendulum 36 the shaft of which, as in Figure 3, is extended above the suspension or pivot point 37 and carries an open sphere 38. The lower side of the pendulum, on the other hand carries a closed sphere 39. The instrument is designed as to structure and relative weights of the various parts so that the device constitutes a pendulum when positioned in an evacuated space. The oscillation period measured under these circumstances may be used for comparing with the oscillation period measured when the pendulum oscillates within an atmosphere of the gas under investigation. If the apparatus is placed in a chamber filled with gas the upward pressure on the lower sphere exerts an influence such as to prolong the period of oscillation. The upward pressure on the upper sphere is for the greater part neutralized by the weight of the gas having penetrated into the sphere. The resultant of all upwardly exerted forces must accordingly prolong the period of oscillation. The mass of the gas in the uppermost sphere, however, also moves with the pendulum. The oscillation period is likewise prolonged by this mass, so that the influences of mass and weight reinforce each other's action.

In order to renew gas slowly in the open sphere it is provided with two oppositely positioned openings 40 which are arranged as shown on Figure 4. A periodical difference in pressure results from the oscillatory movement by the inertia of the gas within the sphere in such a way that at the ends of the stroke, with regard to the surrounding gas, at one opening there is a slight overpressure, at the other opening a slight underpressure. Hereby a passage of gas through the sphere is created.

If the apparatus is to be used for determining the specific gravity of a gas flowing in a passage the densimeter may be arranged in a branch of said passage wherein a very weak gas flow is permitted, so that the pressure is practically the same as that in the passage. It is desirable to mount a gas filter in front of the inlet of the housing. The housing can be constructed so that it can be opened in order to change the recording strip or adjust the apparatus. Such constructive details, however, are not essentially combined with the operation of the apparatus in accordance with the invention.

While I have in the above description defined what I believe to be a preferred and practical embodiment of my invention, it is to be understood that the precise details of construction as What I desire to claim as my invention is:

1. Apparatus for measuring the specific gravity of gases by means of oscillations comprising a vertical pendulum whose shaft extends above its pivot point, the part below the pivot point including a closed hollow member, and that above said pivot point including a hollow member provided with one or more openings.

2. Means for measuring the specific gravity of gases by means of oscillations comprising means forming an external chamber for receiving the gas to be measured and an oscillatory hollow member within said chamber for containing and moving with a body of the gas to be measured, said member being provided with apertures communicating with said external chamber for permitting a slow exchange of the gas from within to without said oscillatory hollow member.

3. Means for measuring the specific gravity of gases by means of oscillations comprising means forming an external chamber for receiving the gas to be measured and an oscillatory hollow member within said chamber for containing and moving with a body of the gas to be measured, said member being provided with apertures communicating with said external chamber for permitting a slow exchange of the gas from within to without said oscillatory hollow member, and mechanical means for sustaining the oscillations of said member.

4. Apparatus for measuring the specific gravity of gases by means of oscillations comprising a vertical pendulum whose shaft is extended above its pivot point and a hollow member carried by the extended end of said shaft, said hollow member being of sufficiently large volume that its movement will be measurably resisted by the ambient gas, and a bob carried by the lower end of the pendulum.

HENDRIK A. ROMP.